United States Patent Office 3,157,869
Patented Nov. 17, 1964

3,157,869
ELECTRIC REMOTE INDICATING SYSTEMS
Michael Edward Clibbon, Harmondsworth, West Drayton, England, assignor to McMichael Radio Limited
Filed May 27, 1960, Ser. No. 32,245
Claims priority, application Great Britain, June 2, 1959, 18,790/59
7 Claims. (Cl. 340—197)

This invention relates to electric remote indicating systems, and especially a system in which the desired indication can be transmitted over a carrier wave or radio link.

As will appear hereinafter, the invention is particularly suitable for use in the remote indication of compass bearings, but can be used in other applications wherein the member or quantity to be indicated can be represented by the relative amplitudes of two signals.

The invention has for its object to provide a system of this kind which is effective in operation and which can be arranged to permit continuous monitoring of the indication afforded.

Figure 1:
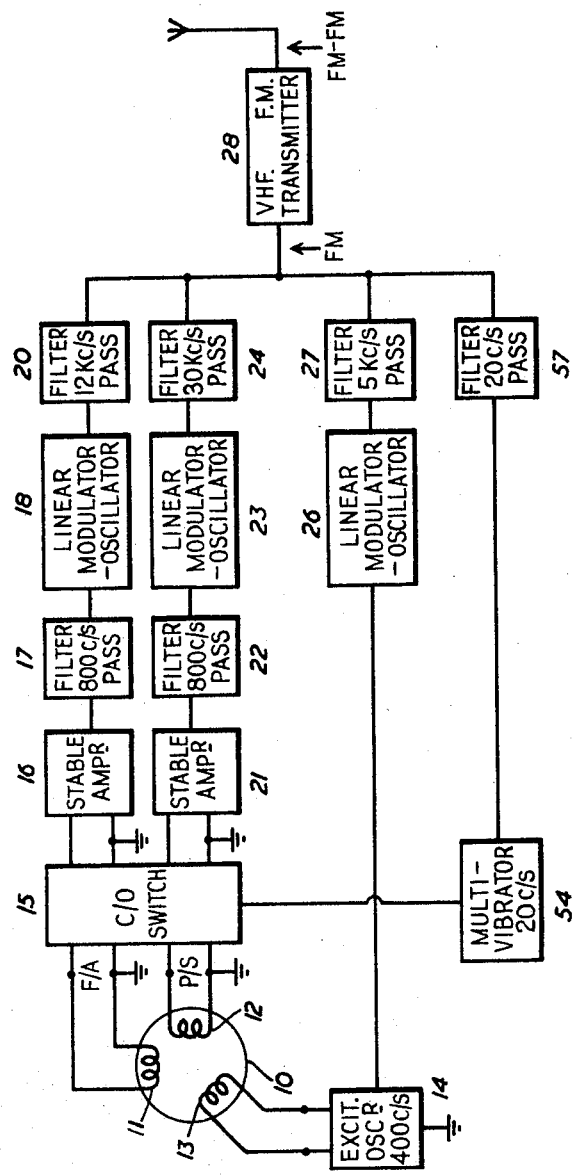
Figure 2:
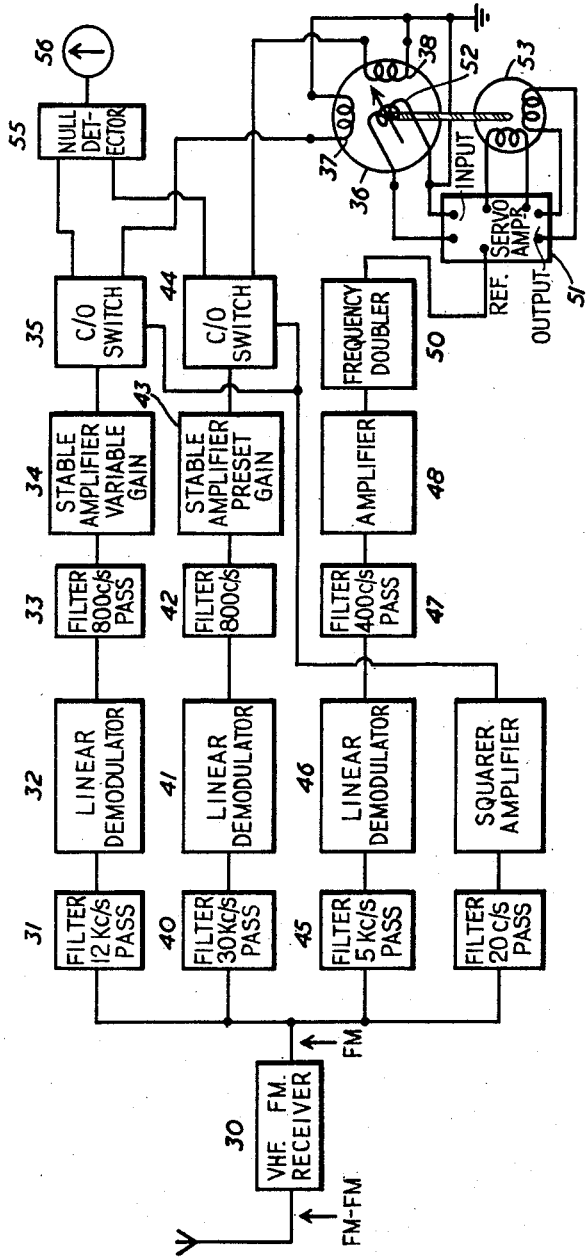

Features and advantages of the invention will appear from the following description of one embodiment thereof, given by way of example, in conjunction with the accompanying drawings in which FIGURES 1 and 2 are block schematic diagrams of transmitter and receiver units respectively.

This embodiment of the invention is a compass or like repeater, for use where the compass bearing is repeated over a radio link to a remote indicator.

The compass unit used in the transmitter is indicated at 10 in FIGURE 1; the compass includes two coils 11 and 12 arranged at right angles. A third coil 13 is energised with an alternating current derived from an oscillator 14, having an output of 400 c./s. Magnetic members associated with the coils are operated near magnetic saturation; there will be obtained in the two coils 11 and 12 two output signals at 800 c./s., proportional to the sine and cosine respectively of an angle between the compass unit and the earth's magnetic field. These two signals can be transmitted over a link to give an indication of bearing angle, but there will be an ambiguity of 180°; to overcome this a phase reference signal is also transmitted. The 400 c./s. energising voltage is used as this reference signal. It follows that for accurate remote indication, the system must transmit the two 800 c./s. output signals accurately in amplitude and phase, and the reference signal accurately in phase.

The three signals are transmitted as modulations on three sub-carriers of a main carrier. The signal from coil 11 is fed, through a switching unit 15 to which reference will be made later, to a stable amplifier 16, and a 800 c./s. narrow pass filter 17 to a linear FM modulator-oscillator unit 18; the signal is thereby impressed as a frequency modulation upon 12 kc./s. carrier. The modulator output is applied to a band pass filter 20.

In a similar way the output from coil 12 is fed to switching unit 15, amplifier 21, filter 22, FM modulator-oscillator 23 and output filter 24; the carrier frequency in this case is 30 kc./s. and units 23 and 24 are designed accordingly.

A signal from the oscillator 14 is fed to a modulator-oscillator 26 operating at 5 kc./s., the output of which is fed to a band pass filter 27. All the signals at outputs of filters 20, 24 and 27 are impressed upon a main frequency modulated transmitter 28.

The receiver is shown in FIGURE 2. The main receiver 30 has a demodulated output fed to separate channels, the first of which includes a 12 kc./s. filter 31, linear demodulator 32, preferably of the counter type, a 800 c./s. narrow filter 33, a stable amplifier 34 of variable gain, a switch unit 35. The unit 35 has two outputs, one of which is fed to an indicator 36 having coils 37, 38 at right angles. The first channel signal is fed to coil 37.

The second channel is similar and includes input filter 40, demodulator 41, filter 42, stable amplifier 43 of preset gain, and switch unit 44, and the channel signal is fed to coil 38. A third channel, for the reference signal, includes a 5 kc./s. filter 45, demodulator 46, a 400 c./s. filter 47, and stable amplifier 48. Output of the amplifier 48 will be at 400 c./s., this is applied through a frequency doubler 50 and fed to the reference input of a servo system 51. The indicator 36 includes a movable coil 52 which can be rotated by a motor 53. The servo system operates to drive coil 52 to a position where the induced voltage is a predetermined value, suitably a minimum. The angular position of the coil 52 will then correspond to the bearing of compass 10. Ambiguity is avoided by feeding the phase reference signal from unit 50 to the servo amplifier.

From the foregoing, it will be appreciated that the accuracy of the system will be dependent upon the gain stability of the system and on certain other factors. It is not practicable to design and maintain amplifiers of specified gain, and means are therefore included in the system whereby its performance can be continuously monitored.

In principle, for this purpose a common input signal is applied to the two transmitting channels; the overall gain of the two channels in the transmitter receiver system is the same, equal signals should appear at the outputs of amplifiers.

The common signal used is the output of one of the coils 11 or 12, and the switch unit 15 is operated by a multivibrator 54 having a fundamental frequency of about 20 c./s. The inputs to amplifiers 16 and 21 are alternately switched to their proper inputs and to one coil 11 or 12; the switch 15 can be a high speed relay but is preferably an electronic switch.

At the receiver the switches 35 and 44 switch the outputs of the two channels to the two coils 37 and 38 and to a null detector 55 and indicator 56. So that switches 15 and 35 and 44 operate in synchronism, the multivibrator signal from unit 54 is applied to a 20 c./s. pass filter 57 and impressed as a further modulation on the transmitted signal from transmitter 28. At the receiver, a 20 c./s. filter 58 selects the corresponding demodulation component, which is squared and amplified at 59 and used to control switches 35 and 44.

If the indicator 56 shows a departure from its predetermined setting the gain of amplifier 34 can be set manually, or automatically in response to the output of detector 55.

It will be understood that the various frequencies mentioned are given as examples only, and that other frequencies can be used as appropriate.

What I claim is:

1. An intelligence transmission system comprising a plurality of transmission channels extending between a first location and a second location, said channels including a first discrete channel having a first intelligence signal input at said first location and a first intelligence signal output at said second location, said channels including also a second discrete intelligence channel having a second intelligence signal input at said first location, a first switching means at said first location and a second switching means at said second location, signal comparison means at said second location for comparing the amplitudes of signals appearing at said first and second outputs in response to signals applied to said first and second intelligence signal inputs, a control signal source at one of said locations and signal means for transmitting the control signal over a third channel from the said one to the other of said locations thereby to correlate in time the operations of said switching means, said switching means being effective periodically to apply to the first and second inputs of said first and second channels and in lieu of said intelligence signals test signals of predetermined relative amplitudes and at that time at the second location to render effective said signal comparing means, whereby said signal comparing means responds to the transmission gain of said first and second channels for intelligence signals, and means at said second location for varying the relative gain, for intelligence signals, of said first and second channels.

2. An intelligence transmission system as set forth in claim 1, and comprising signal source means for applying to said first and second inputs intelligence input signals, the relative amplitude and relative phase of which are significant, said system including a fourth channel between said locations and means for transmitting over said fourth channel a phase reference signal.

3. An intelligence transmission system as set forth in claim 1, wherein said switching means at said first location applies said test signal to said first and second channels simultaneously and at substantially regular time intervals.

4. An intelligence transmission system as set forth in claim 1, wherein one of said intelligence signals is of sustained duration and said switching means connects together the inputs of said first and second channels, whereby said intelligence signals serves as said test signal.

5. A compass bearing transmission system and comprising at a first location an inductive element having an input coil and at least two output coils, means for applying an energizing alternating current to said input coil thereby to produce first and second intelligence signals in said output coils, first, second and third transmission channels extending between said first locating and a second and remote location, said channels having inputs and outputs at said locations respectively, means for applying respectively to inputs of said first and second channels at said first location first and second intelligence signals derived from the output coils of said inductive element for transmission over said first and second channels to outputs at said second location, switching means for intermittently applying to the inputs of said first and second channels at said first location test signals of predetermined relative amplitude and at that time rendering ineffective the transmission of intelligence simultaneously in both the first and second channels, signal amplitude comparison means at said second location, switching means at said second location for intermittently deriving from said first and second channels in response to said test signals, signals indicative of the transmission gains for intelligence signals of said first and second channels respectively and for applying said derived signals to said comparison means, means for transmitting over said third channel a synchronizing signal for synchronizing said switching means at said first and second locations and means for adjusting the relative transmission gains of said first and second channels for intelligence signals.

6. A compass bearing transmission system as set forth in claim 5, and comprising a fourth channel extending between said locations and means for transmitting over said fourth channel a signal derived from said energizing current as a phase reference signal for said intelligence signals.

7. A compass bearing transmission system as set forth in claim 5, including an alternating current switching signal generator at said first location, means for controlling the operation of said switching means in response to said switching signal, and means for applying said alternating switching signal to the input of said third channel.

References Cited in the file of this patent
UNITED STATES PATENTS

| | | |
|---|---|---|
| 1,472,455 | Blattner | Oct. 30, 1923 |
| 1,807,510 | Clement | May 26, 1931 |
| 2,505,585 | Silent | Apr. 25, 1950 |
| 2,736,007 | Kenyon | Feb. 21, 1956 |